H. Strickler.
Hoisting-Drum.

N° 74445. Patented Feb. 11, 1868

Witnesses.
W. C. Aslkettle
Thos. Tusche.

Inventor.
H. Strickler
per Munn & Co.
attys

United States Patent Office.

HENRY STRICKLER, OF CARLISLE, PENNSYLVANIA.

Letters Patent No. 74,445, dated February 11, 1868.

---

IMPROVEMENT IN HOISTING-DRUM.

---

*The Schedule referred to in these Letters Patent and making part of the same.*

---

TO ALL WHOM IT MAY CONCERN:

Be it known that I, HENRY STRICKLER, of Carlisle, in the county of Cumberland, and State of Pennsylvania, have invented a new and improved Hay-Hoisting Drum; and I do hereby declare that the following is a full, clear, and exact description thereof, which will enable those skilled in the art to make and use the same, reference being had to the accompanying drawings, forming part of this specification, in which—

Similar letters of reference indicate corresponding parts.

Figure 1:
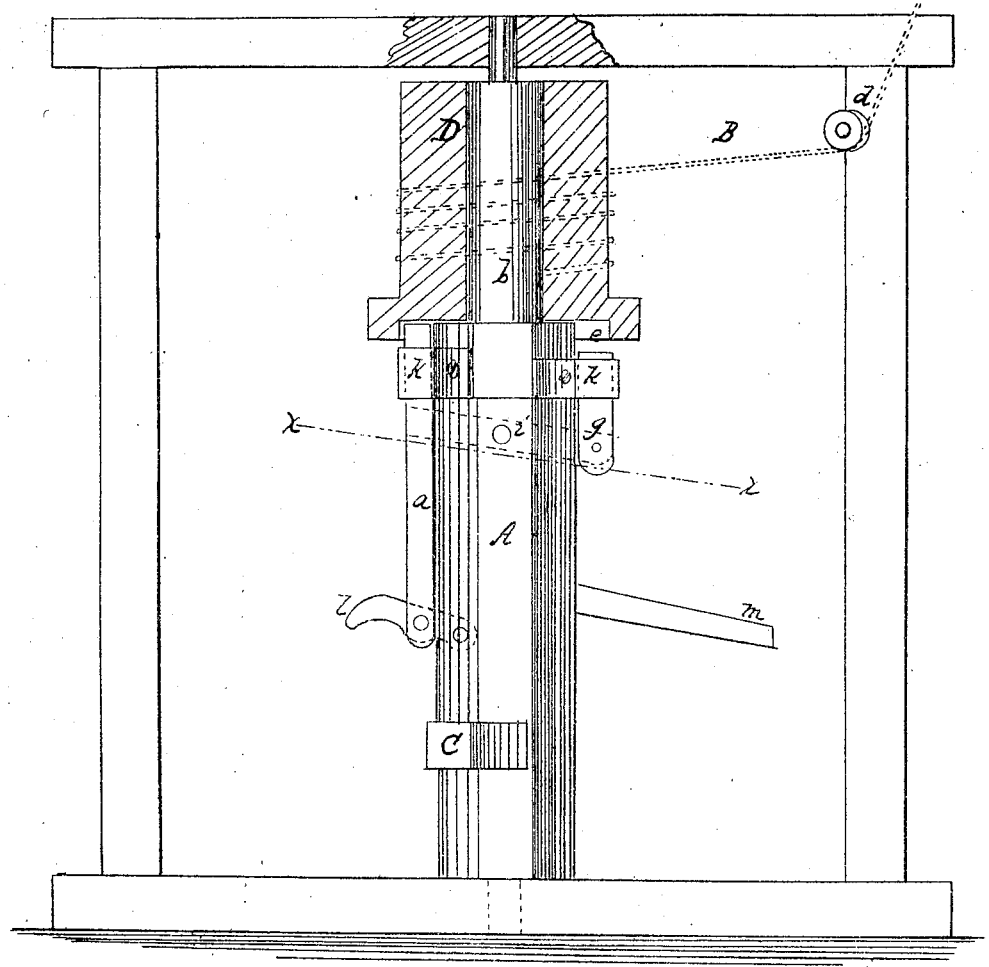
Figure 1 is a sectional elevation of my invention.
Figure 2:
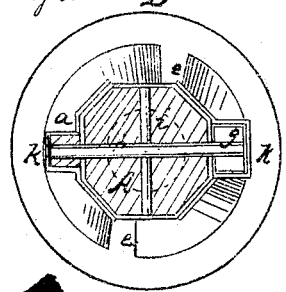
Figure 2 is a section of the shaft, through the line $x\ x$, fig. 1.

This invention refers to a drum or whin for the purpose of unloading hay from a wagon, and is designed to be located in some suitable place near or within the entrance of a barn. It consists of a drum, working on a vertical shaft, the said drum being held firmly by means of a ratchet-device, when the shaft is turned to wind up the cord, lifting the hay from the wagon, and liberated when the hay is to be lowered into the mow. These parts, together with other devices perfecting the whole, will be hereinafter more fully set forth.

In the drawings, A is a shaft, of wood, having a reduced end, $b$, on which the drum D revolves. This drum winds a cord, B, which terminates in a hay-harpoon, or other equivalent mechanism for grasping a large quantity of hay. A sweep-bar, C, is for the purpose of hitching thereto a horse or mule, which is driven around in the ordinary manner. $m$ is the halter-staff. The drum D winds up the cord B, which passes over some pulley in the upper part of the barn, but first against a guide-pulley, $d$, which latter holds the cord in the proper position with reference to the drum.

In order that the hay can be lowered without backing the horse, a ratchet-device, consisting of the lever $h$, pawl $a$, and ratchet-teeth $e$, is provided, and when it is required to lower the hay previously lifted, the pawl $a$ is pressed down, and the drum being liberated, revolves upon its bearing, $b$, whereby the cord is unwound and the hay descends upon the mow. That the hay may not descend too rapidly, the brake $g$, pivoted to the end of the lever $h$, serves, as its name imports, to stop the drum, for when the pawl $a$ is pressed downward still more, the brake $g$ encounters the lower face of the drum, and causes sufficient braking-friction. The brake $g$ and the pawl $a$ have vertical motion in the guides $k$, which, in practice, would be a cast-iron plate, formed substantially as shown. The lever is pivoted at $i$, within a central mortise in the shaft A. The base of the drum is notched around the edge with several large notches, $e$, for the purpose of catching against the pawl $a$, for the purpose of enabling the said pawl to hold the drum rigidly when the cord is being wound thereon. The pawl $a$ is pivoted to the lever $h$ and the handle $l$, and by the latter the pawl and the brake are operated.

The common method of unloading hay with a horse was to hitch the cord to the whiffle-tree, and lead the animal to and fro in the operation of unloading. My improvements dispense with this objectionable method, and provide the means of unloading hay in a more satisfactory manner than that cited above.

The shaft may have bearings in some part of the frame of the barn, or may be set in a separate frame, as shown. In large barns, this invention has been found by practical trial to be a great improvement upon the methods heretofore practised. The parts composing the machine are few and simple, and consequently will be of small cost.

I claim as new, and desire to secure by Letters Patent—

The combination of the vertical shaft A, the loose drum D, working thereon, the pawl $a$, and brake $g$, both pivoted to lever within guide $k$, the sweep-bar C, and the cord B, all arranged substantially as shown and described, and for the purpose specified.

The above specification of my invention signed by me, this 11th day of December, 1867.

HENRY STRICKLER.

Witnesses:
C. B. THOMPSON,
ALEX. F. ROBERTS.